United States Patent [19]
Tamano et al.

[11] 3,944,790
[45] Mar. 16, 1976

[54] ELECTRONIC DIGITAL TIMER FOR AN ELECTRONIC RANGE

[75] Inventors: Motokazu Tamano, Yokohama; Masanobu Yoshioka, Fuji, both of Japan

[73] Assignee: Tokyo Shibaura Electric Co., Ltd., Tokyo, Japan

[22] Filed: Apr. 12, 1974

[21] Appl. No.: 460,465

[30] Foreign Application Priority Data
Apr. 16, 1973  Japan................................ 48-42875
Apr. 18, 1973  Japan................................ 48-43977

[52] U.S. Cl.................. 235/92 T; 99/332; 219/492; 235/92 R
[51] Int. Cl.².......................................... G06M 3/02
[58] Field of Search...... 99/327, 332, 335; 219/492; 58/33; 235/92 T, 92 CA, 132 E

[56] References Cited
UNITED STATES PATENTS

| | | | |
|---|---|---|---|
| 3,128,373 | 4/1964 | Phlieger............................ | 235/92 T |
| 3,391,305 | 7/1968 | Bradwin et al.................... | 235/92 T |
| 3,789,195 | 1/1974 | Meier et al........................ | 235/92 T |

*Primary Examiner*—Joseph M. Thesz, Jr.
*Attorney, Agent, or Firm*—Oblon, Fisher, Spivak, McClelland & Maier

[57] ABSTRACT

An electronic digital timer for an electronic range wherein the desired time of cooking is determined by a time setter; the time of cooking thus set is indicated in a digital fashion; a counter counts the number of pulses generated when the electronic range commences heating; and the heating operation is brought to an end when coincidence takes place between the number of counts made by the counter and a number determined corresponding to the preset time.

11 Claims, 22 Drawing Figures

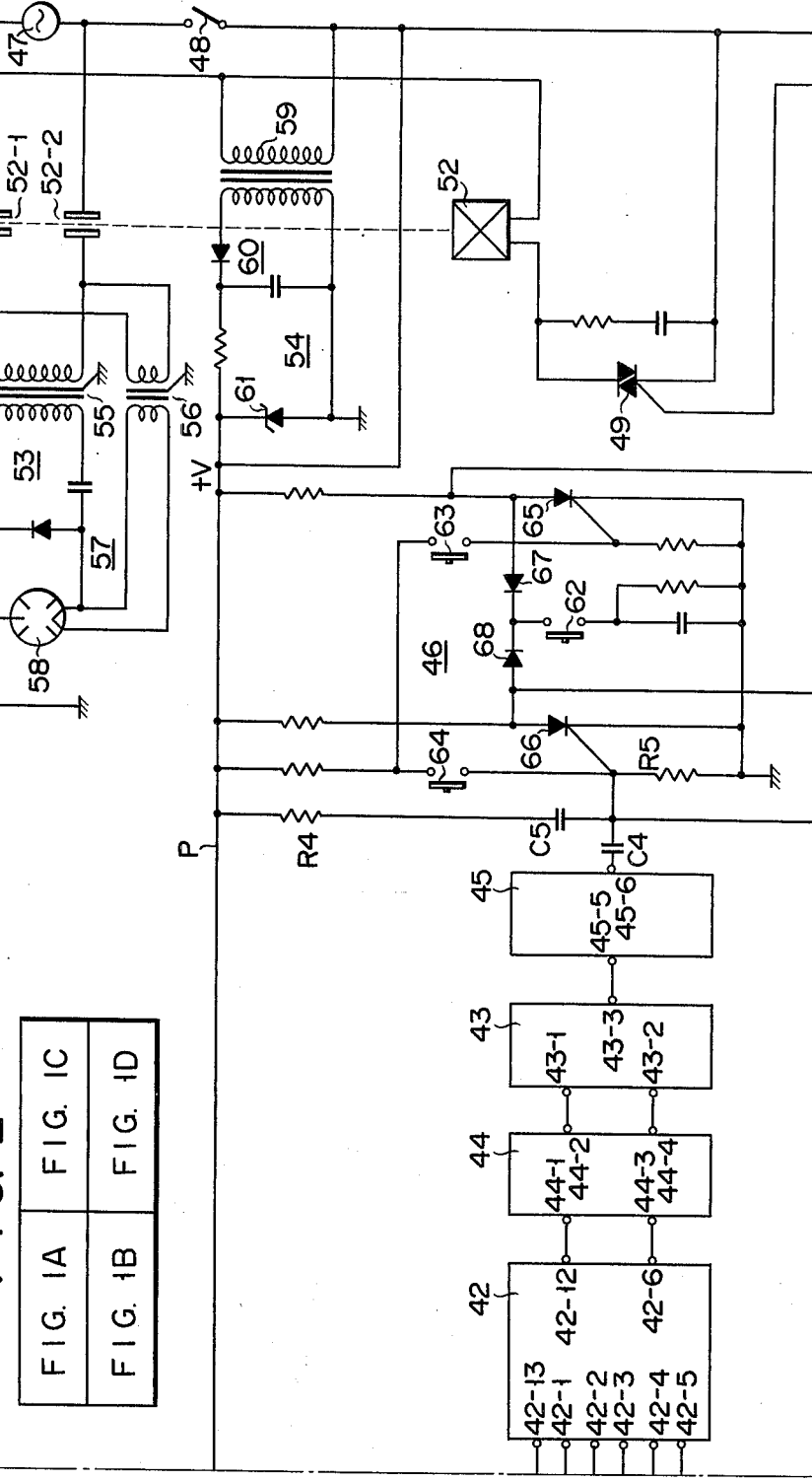

FIG. 7
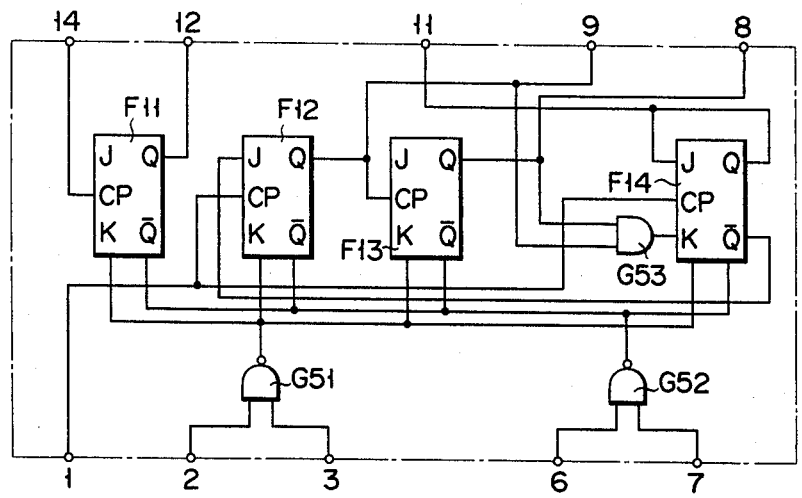
FIG. 8
| COUNT | OUTPUT | | | |
|---|---|---|---|---|
| | A | B | C | D |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
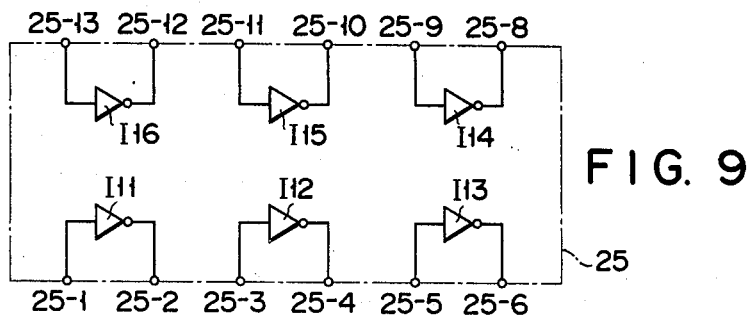
FIG. 9

F I G. 17
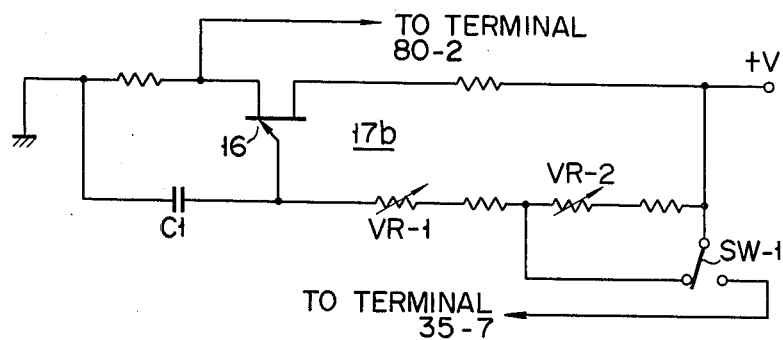
F I G. 18
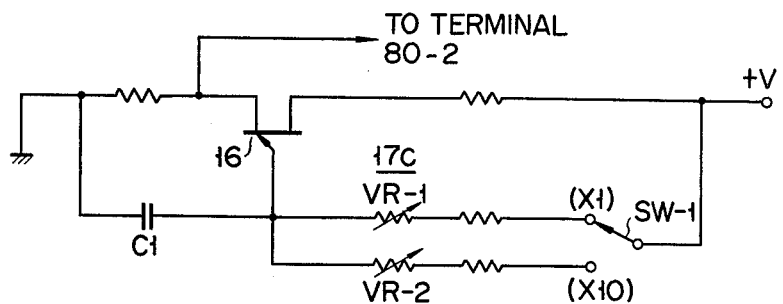

ELECTRONIC DIGITAL TIMER FOR AN ELECTRONIC RANGE

BACKGROUND OF THE INVENTION

This invention relates to an electronic digital timer for an electronic range designated to set the time of cooking or heating.

To date, a cooking time setter for an electronic range had generally consisted of a motor timer constructed by a combination of a synchronous motor and gear mechanism or a mechanical timer such as a spring type timer. This spring type timer requires a timer needle to be manually rotated whenever the time of cooking is set and involves a very much complicated operation. Since said timer indicates time solely by means of the needle, an actual lapse of time can not be found, if the needle is fixed at a point of preset time. On the contrary, if the needle is made to rotate as time goes on, then it will be impossible to trace the originally set time. In either case, the needle tends to give rise to the erroneous observation of time and the misunderstanding of the originally set time. Such difficulties have sometimes led to the incorrect setting of cooking time widely apart from a prescribed value, resulting in insufficient cooking. On the other hand, the mechanical timer is relatively bulky and readily subject to failure.

It is accordingly the object of this invention to provide an electronic digital timer for an electronic range which enables the time of cooking to be set correctly and easily within a broad range, indicates an originally set time as well as a lapse of time from said set point and furthermore assists in the miniaturization of an electronic range.

SUMMARY OF THE INVENTION

An electronic digital timer according to this invention for an electronic range essentially comprises a time-setting section for setting a desired time of cooking in the form of digits; a pulse generating-section for producing clock pulses at a prescribed interval; a counter for counting clock pulses delivered from the clock pulse generating-section when the electronic range commences heating; and means for bringing heating by the electronic range to an end when coincidence takes place between the number of counts made by the counter and a value representing the desired time of cooking.

A desired time of cooking determined by the time-setting section and the counts made by the counter can be indicated by an electronic digital display device in the digital form where required. Further, the process of directly detecting coincidence between the number of the counts made by the counter and a value representing a desired time of cooking may be replaced by the process of first storing the counter with a value denoting a desired time of cooking, conducting pulse signals to the counter upon receipt of a signal instructing the commencement of heating by an electronic range, progressively counting down the value previously stored in the counter and, when said value is reduced to zero, bringing heating by the electronic range to an end.

BRIEF DESCRIPTION OF THE DRAWINGS

FIGS. 1A to 1D jointly illustrate the circuit arrangement of an electronic range provided with an electronic digital timer according to an embodiment of this invention;

FIG. 2 indicates the relative positions of the sections of FIGS. 1A to 1D;

FIG. 7 is a circuit diagram of a counter used in FIGS. 1A to 1D;

FIG. 8 is a decimal truth value represented by the binary code signals by which the counter of FIG. 7 makes counts;

FIG. 9 is a circuit diagram of the inverters of FIGS. 1A to 1D constituting an integral circuit;

FIGS. 17 and 18 are circuit diagrams of the modifications of the pulse-generating sections of FIGS. 15A and 15B.

DESCRIPTION OF THE INVENTION

Figure 1A:
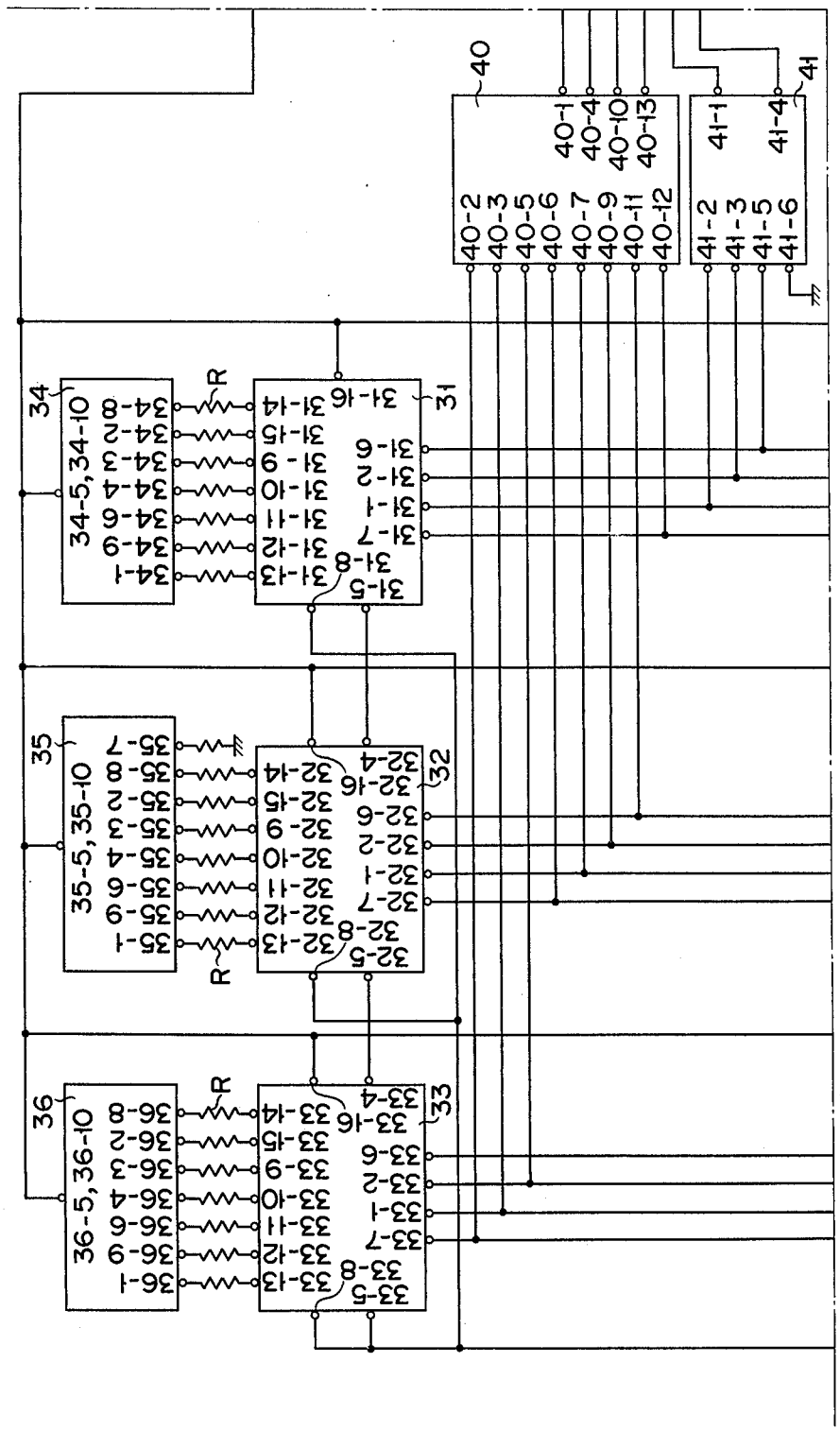
Figure 1B:
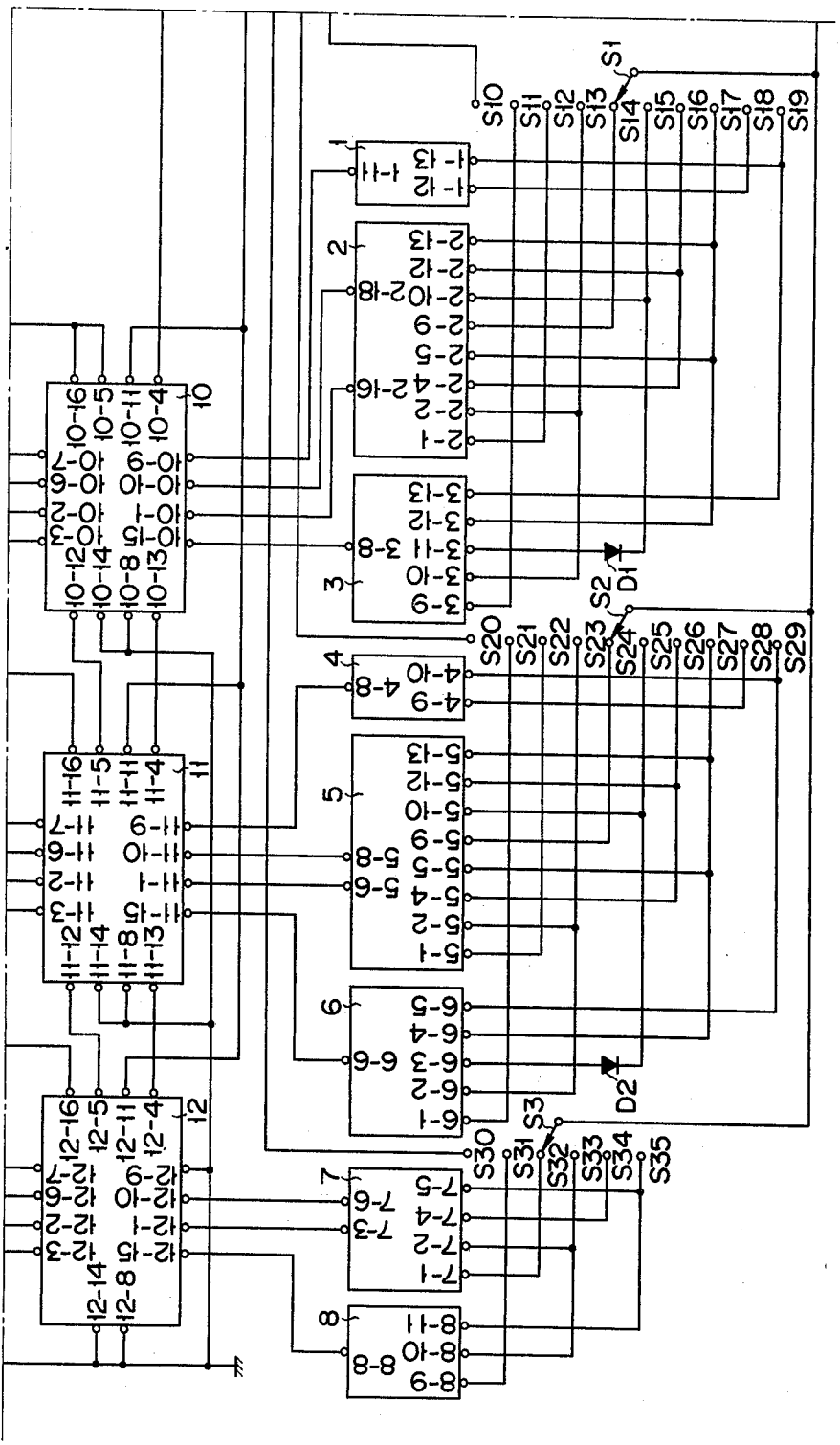
Figure 1D:
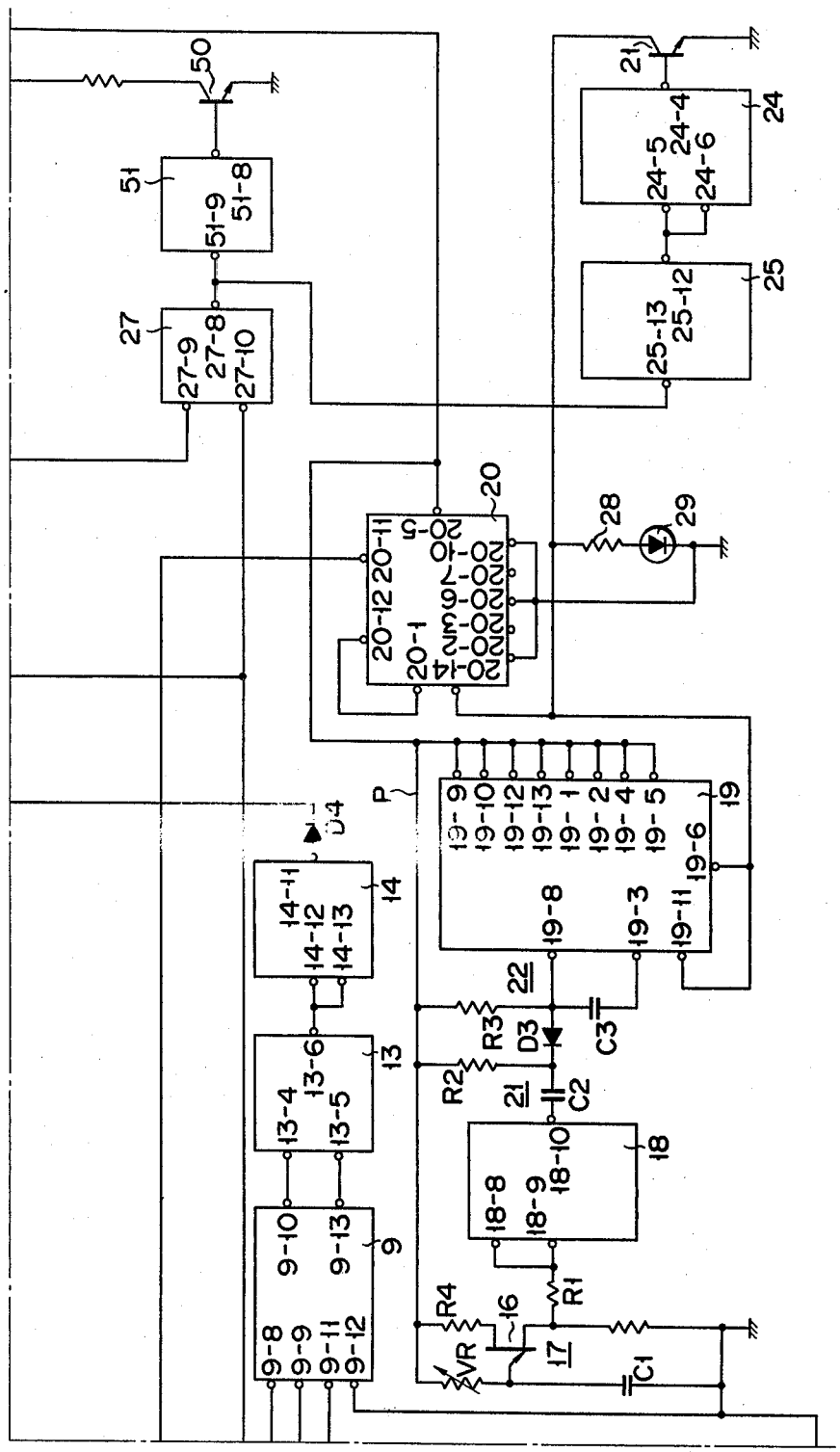

FIGS. 1A to 1D jointly present a block circuit diagram of an electronic range provided with an electronic digital timer according to an embodiment of this invention. The sections of FIGS. 1A to 1D occupy the relative positions shown in FIG. 2. The time-setting switches S1, S2, S3 of the time-setting section of FIGS. 1B and 1D are provided with fixed contatcs S10 to S19, S20 to S29 and S30 to S35 respectively designed to indicate time on the decimal basis in units of 0.1 minute, units of 1 minute and units of 10 minutes. Therefore, the above-mentioned three switches S1, S2, S3 can set time ranging from 0 to 59.9 minutes in divisions of 0.1 minute. The movable contacts of said three switches S1, S2, S3 are grounded. The fixed contacts S10 to S19 are connected to a decimal numeral-binary code conversion circuit consisting of three gate circuits 1, 2, 3. The fixed contacts S20 to S29 are connected to a decimal numeral-binary code conversion circuit consisting of three gate circuits 4, 5, 6. The fixed contacts S30 to S35 are connected to a decimal numeral-binary code conversion circuit consisting of two gate circuits 7, 8. These three conversion circuits generate a 4-bit binary signal coded with a weight of 1-2-4-8 and a 3-bit binary signal coded with a weight of 12-4. The fixed contact S10 of the time-setting switch S1 is connected to the terminal 9-11 of a gate circuit 9. The terminals 1-12, 1-13 of the gate circuit 1 are connected to contacts S18, S19; the terminals 2-1, 2-2, 2-4, 2-5, 2-9, 2-10, 2-12, 2-13 of the gate circuit 2 to contacts S12, S13, S16, S17, S13, S15, S16, S17; the terminals 3-9, 3-10, 3-12, 3-13 of the gate circuit 3 to contacts S11, S13, S17, S19; and the terminal 3-11 of gate circuit 3 to a contact S15 through a diode D1. The contact S20 of the time-setting switch S2 is connected to the terminal 9-9 of the safe circuit 9.

Figure 3:
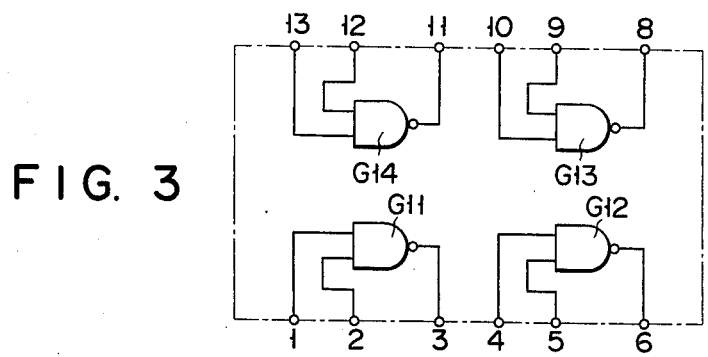
FIGS. 3 to 6 show various gate circuits of FIGS. 1A to 1D constituting an integrated circuit.

The terminals 4-9, 4-10 of the gate circuit 4 are connected to contacts S27, S28; the terminals 5-1, 5-2, 5-4, 5-5, 5-9, 5-10, 5-12, 5-13 of the gate circuit 5 to contacts S22, S23, S24, S25, S26, S27; the terminals 6-1, 6-2, 6-4, 6-5 of the gate circuit 6 to contacts S21, S23, S27, S29; the terminal 6-3 of the gate circuit 6 to the contact S25 through a diode D2; the contact S30 of the time-setting switch S3 to the terminal 9-8 of the gate circuit 9; the terminals 7-1, 7-2, 7-4, 7-5 of the gate circuit 7 to contacts S32, S33, S34, S35; and the terminals 8-9, 8-10, 8-11 of the gate circuit 8 to contacts S31, S33, S35. The contacts S10-S19 of the time-setting switch S1 are associated with 0, 0.1, 0.2 . . . 0.9 minutes. The output terminals 1-11, 2-16, 2-18 and 3-8 of the gate circuits 1, 2 and 3 generate 4-bit binary signals coded with a weight of 1-2-4-8. These 4-bit binary signals are supplied to the input terminals 10-9, 10-10, 10-1, 10-15 of a gate circuit 10 of the counter section. The contacts S20-S29 of the time-setting switch S2 are associated with 0, 1, 2, 3 . . . 9 minutes, and produce 4-bit binary signals coded with a weight of 1-24-8. These 4-bit binary signals are conducted to the input terminals 11-9, 11-10, 11-1, 11-15 of a gate circuit 11 of the counter section. The contacts S30 to S35 of the time-setting switch S3 are used to indicate 0, 10, 20, 30, 40 and 50 minutes. The output terminals 7-3, 7-6 and 8-8 of the gate circuits 7 and 8 give forth 3-bit binary signals coded with a weight of 1-2-4. These 3-bit binary signals are transmitted to the input terminals 12-1, 12-10, 12-15 of a gate circuit 12 of the counter section. The gate circuits 1, 2, 4, 5, 7 are actually integrated as shown in FIG. 3. the referential numerals of the terminals of the respective gate circuits of FIG. 3 correspond to those following the hyphens included in the referential notations indicated in FIG. 1B. For example, the terminal 12 of FIG. 3 corresponds to the terminals 1-12, 2-12, 5-12 of the gate circuits 1, 2, 5. The gate circuits 1, 2, 4, 5, 7 are each provided with four NAND gate circuits G11, G12, G13, G14 as shown in FIG. 3. Two input terminals of the NAND gate circuit G11 are connected to the terminals 1, 2 and the output terminal thereof to the terminal 3. The input terminals of the NAND gate circuit G12 are connected to the terminals 4, 5 and the output terminal thereof to the terminal 6. The input terminals of the NAND gate circuit G13 are connected to the terminals 9, 10 and the output terminal thereof to the terminal 8. The input terminals of the NAND gate circuit G14 are connected to the terminals 12, 13 and the output terminal thereof to the terminal 11.

Figure 4:
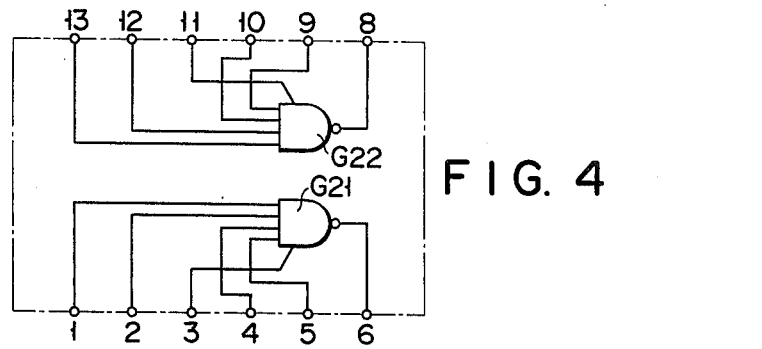

The gate circuits 3, 6 are concretely arranged as shown in FIG. 4. The referential numerals of the integrated circuit of FIG. 4 correspond to those following the hyphens included in the referential notations of the gate circuits 3, 6 of FIG. 1B. Namely, the terminal 13 of FIG. 4 corresponds to, for example, the terminal 3-13 of the gate circuit 3 of FIG. 1B. The gate circuits 3, 6 respectively consist of a NAND/NOR buffer gate circuit G21 provided with an expander terminal 3 and another NAND/NOR buffer gate circuit G22 provided with an expander terminal 10. The input terminals of the NAND/NOR buffer gate circuit G21 are connected to the terminals 1, 2, 4, 5 and the output terminal thereof to the terminal 6. The input terminals of the NAND/NOR buffer gate circuit G22 are connected to the terminals 9, 10, 12, 13 and the output terminal thereof to the terminal 8.

Figure 5:
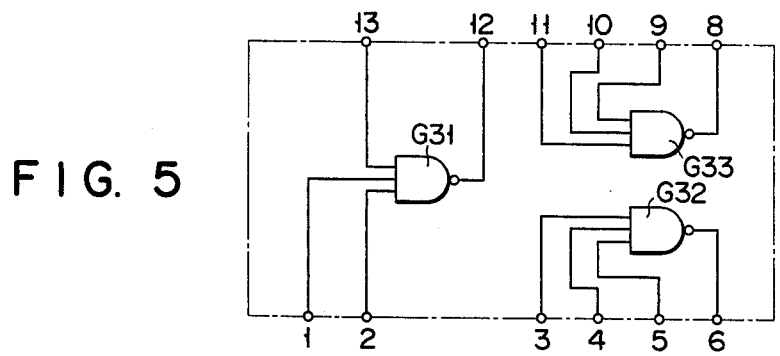

There will now be described by reference to FIG. 5 the concrete arrangement of the gate circuit 8. This gate circuit 8 is formed of three NAND/NOR gate circuits G31, G32, G33. The input terminals of the NAND/NOR gate circuit G31 are connected to the terminals 1, 2, 13 and the output terminal thereof to the terminal 12. The input terminals of the NAND/NOR gate circuit G32 are connected to the terminals 3, 4, 5 and the output terminal thereof to the terminal 6. The input terminals of the NAND/NOR gate circuit G33 are connected to the terminals 9, 10, 11 and the output terminal thereof to the terminal 8.

The gate circuit 9 connected to the contacts S10, S20, S30 of the time-setting switches S1, S2, S3 respectively and gate circuits 13, 14 connected to the gate circuit 9 jointly act as a circuit for stopping the operation of the electronic digital timer and that of the later described electronic range controlling section, where the time of cooking is set at zero, namely where all the time-setting switches S1, S2, S3 are connected to the contacts S10, S20, S30 respectively.

Figure 6:
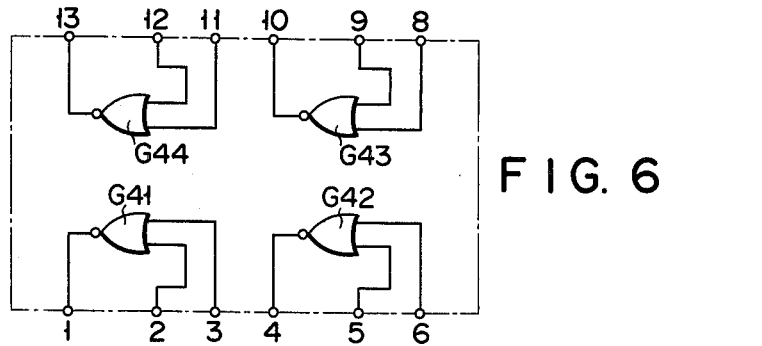

The terminals 9-10, 9-13 of the gate circuit 9 are connected to the terminals 13-4, 13-5 of a gate circuit 13 and the output terminal 13-6 of a gate circuit 13 is connected to both input terminals 14-12, 14-13 of a gate circuit 14. The gate circuit 9 is formed in an integrated circuit consisting of four NOR gate circuits G41, G42, G43, G44 as shown in FIG. 6. The input terminals of the NOR gate circuit G41 are connected to the terminals 2, 3 and the output terminal thereof to the terminal 1. The input terminals of the NOR gate circuit G42 are connected to the terminals 5, 6 and the output terminal thereof to the terminal 4. The input terminals of the NOR gate circuit G43 are connected to the terminals 8, 9 and the output terminal thereof to the terminal 10. The input terminals of the NOR gate circuit G44 are connected to the terminals 11, 12 and the output terminal thereof to the terminal 13. Gate circuits 13, 14 have the same arrangement as shown in FIG. 3.

A pulse generating section has a circuit arrangement as indicated in FIG. 1D. This pulse-generating section includes a time constant circuit having a variable resistor VR and capacitor C1 and a pulse oscillator 17 formed of a unijunction transistor 16 and gives forth pulses at a prescribed interval. An output from the pulse generator 17 is supplied to the terminals 18-8, 18-9 of a gate circuit 18 through a resistor R1. A terminal 18-10 is connected to one end of a resistor R2 and the cathode of a diode D3 through a capacitor C2. The anode of the diode D3 is connected to one end of a resistor R3, one end of a capacitor C3 and the terminal 19-8 of a gate circuit 19. The other end of the capacitor C3 is connected to a terminal 19-3 and terminals 19-6, 19-11 are connected to the terminal 20-14 of a decimal decoder counter 20 and the collector of a transistor 21. The variable resistor VR, one end each of resistors R4, R2, R3, the terminals 19-1, 19-2, 19-4, 19-5, 19-9, 19-10, 19-12, 19-13 of the gate circuit 19 are connected to a positive line P of a D.C. source. The gate circuit 18, resistor R2 and capacitor C2 jointly act as a trigger circuit 21, an output from which is supplied to a monostable multivibrator 22 consisting of the resistor R3, capacitor C3 and gate circuit 19 through the diode D3 so as to trigger said multivibrator 22. An output pulse from the pulse generator 17 whose wave form has been shaped by the monostable multivibrator 22 is delivered to the decoder counter 20. The gate circuit 18 is arranged as shown in FIG. 6 and the gate circuit 19 is arranged as shown in FIG. 4. The decoder counter 20 comprises, as indicated in FIG. 7, four J-K flip-flop circuits F11, F12, F13, F14 and NAND/NOR gates G51, G52 and an AND gate G53. The input terminal 1 of the decoder counter of FIG. 7 is connected to the clock pulse input terminals of the J-K flip-flop circuits F12, F14. The reset signal input terminals 2, 3 of the decoder counter 20 of FIG. 7 are connected to the input terminal of an NAND/NOR gate G51. The reset signal input terminals 6, 7 of the counter 20 are connected to the input terminal of the NAND/NOR gate G52. The output terminals of the NAND/NOR gates G51, G52 are connected to the reset terminals of the J-K flip-flop circuits F11-F14 respectively. The clock pulse input terminal Cp of the J-K flip-flop circuit F11 is connected to the input terminal 14 of the decoder counter 20. The Q output terminal of the J-K flip-flop circuit F11 is connected to the output terminal 12 of the decoder counter 20. The J input terminal of the J-K flip-flop circuit F12 is supplied with a $\overline{Q}$ output from the J-K flip-flop circuit F14. A Q output from the J-K flip-flop circuit F12 is supplied to the Cp terminal of the flip-flop circuit F13, one input terminal of an AND gate G53 and the output terminal 9 of the decoder counter 20. A Q output from the J-K flip-flop circuit F13 is conducted to the other input terminal of the AND gate G53 and the output terminal 8 of the decoder counter 20. The J input terminal of the J-K flip-flop circuit F14 is connected to the Q output terminal thereof and the output terminal 11 of the decoder counter 20. The K input terminal of the J-K flip-flop circuit F14 is connected to the output terminal of the AND gate G53. Referring to FIG. 1D, the terminal 20-1 of the decoder counter 20 is connected to the terminal 20-12, and the terminals 20-2, 20-6, 20-10 of the decoder counter 20 are jointly grounded. The terminal 20-5 is connected to the positive line P of the power source, and the terminal 20-11 to the terminal 10-4 of the gate circuit 10.

The decoder counter 20 is supplied at the terminal 20-14 with outputs from the terminals 19-6, 19-11 of the gate circuit 19 and gives forth a count output in the form of a 4-bit binary code signal. FIG. 8 shows the truth table of binary code signals relating to the decimal numerals of 0 to 9 delivered from the terminals 20-12, 20-9, 20-8, 20-11.

The base of an NPN transistor 21 connected to the pulse-generating section is connected to the output terminal 24-8 of a gate circuit 24. The input terminals 24-5, 24-6 of the gate circuit 24 are jointly connected to the output terminal 25-12 of an inverter circuit 25, whose input terminal 25-13 is so connected as to receive an operation signal from the output terminal 27-8 of a gate circuit 27 of the later described operation circuit 46. The output terminals 19-6, 19-11 of the gate circuit 19 of the pulse-generating section are connected to the decoder counter 20 through the NPN transistor 21 which is turned on or off according to an output from the operation circuit 46 or otherwise grounded. The gate circuit 24 consists of an integrated circuit shown in FIG. 6, and the inverter circuit 25 is formed of an integrated circuit indicated in FIG. 9. Referring to FIG. 9, the input terminals of six inverter circuits I11, I12, I13, I14, I15, I16 are connected to the terminals 25-1, 25-3, 25-5, 25-9, 25-11, 25-13. The output terminals of the six inverter circuits are connected to the terminals 25-2, 25-4, 25-6, 25-8, 25-10, 25-12. The inverter I16 included in the integrated circuit of FIG. 9 is used in FIG. 1D.

The output terminals 19-6, 19-11 of the gate circuit 19 are grounded through a resistor 28 and light-emitting diode 29. This light-emitting diode 29 intermittently gives forth light in synchronization with pulses delivered from the pulse-generating section, thereby indicating the operating condition of the pulse-generating section.

Figure 10:
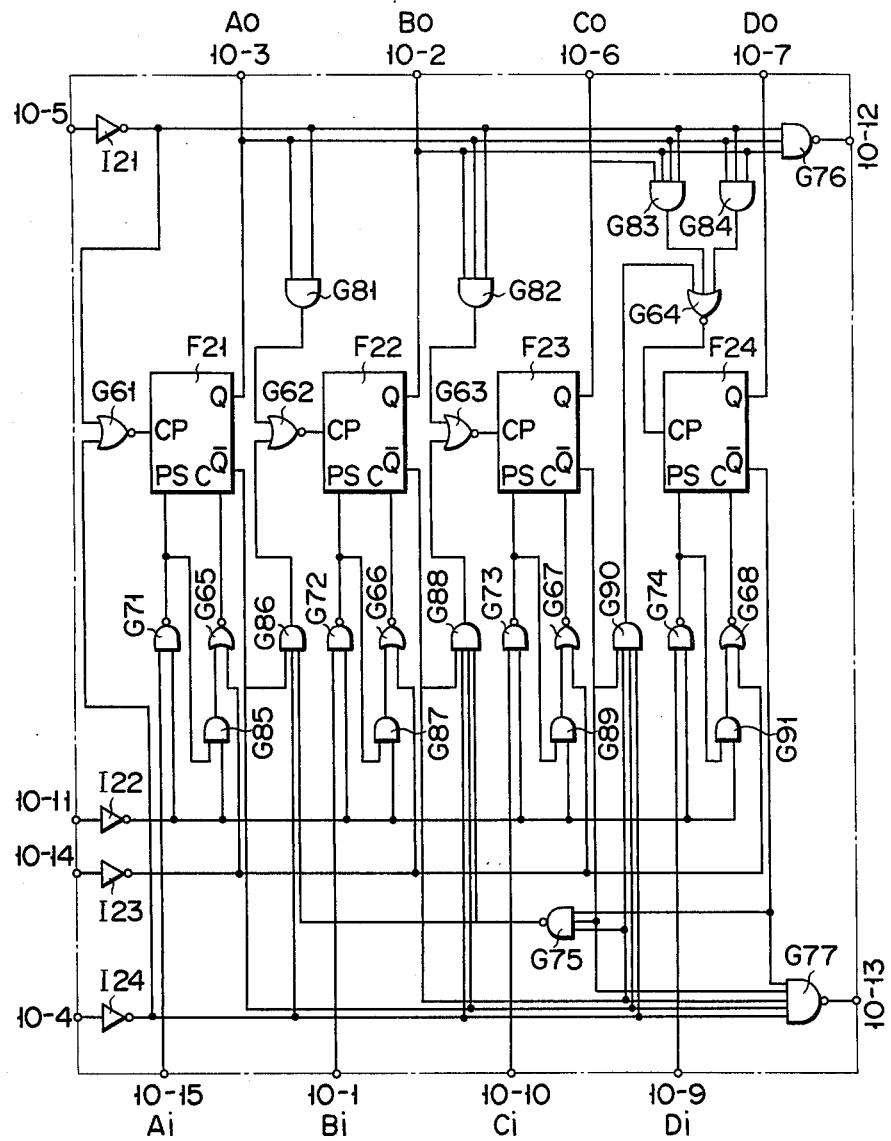
FIG. 10 is a circuit diagram of an up-down counter used in FIGS. 1A to 1D.

The gate circuits 10, 11, 12 of the counter section receive binary code signals representing a prescribed time of cooking which are delivered from the time-setting section through the terminals 10-1, 10-9, 10-10, 10-15, 11-1, 11-9, 11-10, 11-15 and 12-1, 12-10, 12-15. Thus the gate circuits 10, 11, 12 are set at values corresponding to the binary code signals. The decoder counters of the counter section are decimal up-down type designed to count down pulses from the counter 20 of the pulse-generating section, when the operation circuit 46 gives forth a signal instructing the commencement of cooking. For example, the up-down counter 10 is formed of four flip-flop circuits F21 to F24, NOR gate circuits G61 to G68, NAND/NOR gate circuits G71 to G77, AND gate circuits G81 to G91 and inverters I21 to I24 as shown in FIG. 10. The circuitry of FIG. 10 is also integrated. Other up-down counters 11, 12 have the same arrangement as that of FIG. 10. The numerals following the hyphens included in the referential notations given in FIG. 10 correspond to those of said other counters 11, 12. Referring to FIG. 10, 4-bit binary code signals for setting time of 0 to 0.9 minute which are supplied to the input terminals 10-1, 10-9, 10-10, 10-15 are conducted to one input terminal each of the NAND gates G71, G72, G73, G74. The other input terminal each of the NAND gates G71, G72, G73, G74 is supplied through an inverter I22 with a strobe signal delivered from the operation circuit 46. Outputs from the NAND gates G71 to G74, together with that from the inverter I22, are supplied to AND gates G85, G87, G89, G91, outputs from which are conducted to NOR gates G65, G66, G67, G68 together with clear signals delivered from the terminal 10-14 through an inverter I23. Outputs from the NAND gates G71 to G74 are transmitted to the Ps terminals of the flip-flop circuits F21 to F24. Outputs from the NOR gates G65 to G68 are supplied to the clear terminal C. The down-count terminal 10-4 and up-count terminal 10-5 are connected to the input terminal of the NOR gate G61 through the inverters I24, I21, and also to the input terminals of the AND gates G81, G82, G83, G84 and NAND/NOR gate G76 and those of the AND gates G86, G88, G90 and NAND/NOR gate G77. An output from the NOR gate G61 is conducted to the Cp terminal of the flip-flop circuit F21, a Q output from which is supplied to the output terminal 10-3 of the up-down counter of FIG. 10, AND gates G81, G82, G83, G84 and NAND gate G76. A $\overline{Q}$ output from the flip-flop circuit F21 is transmitted to the input terminals of the AND gates G86, G88, G90 and NAND gate G77. A Q output from the flip-flop circuit F22 is supplied to the output terminal 10-2 of the up-down counter and the input terminals of the AND gates G82, G83, G84 and NAND gate G76. A $\overline{Q}$ output from the flip-flop circuit F22 is conducted to the AND gates G88, G90 and NAND gates G75, G77. A Q output from the flip-flop circuit F23 is transmitted to the output terminal 10-6 of the up-down counter and AND gate G83 and a $\overline{Q}$ output therefrom is supplied to the AND gate G90 and NAND gates G75, G77. A Q output from the flip-flop circuit F24 is delivered to the output terminal 10-7 of the up-down counter, and a $\overline{Q}$ output therefrom to the NAND gates G75, G77. An output from the NAND gate G75 is supplied to the AND gates G86, G88, outputs from which are delivered to the NOR gate G62. An output from the NOR gate G62 is transmitted to the Cp terminal of the flip-flop circuit F22. Outputs from the AND gates G82, G88 are conducted to the NOR gate G63, an output from which is supplied to the Cp terminal of the flip-flop circuit F23. Outputs from the AND gates G83, G84, together with an output from the AND gate G90, are transmitted to the NOR gate G64, an output from which is delivered to the Cp terminal of the flip-flop circuit F24. An output from the NAND gate G76 is conducted to the terminal 10-12 as a carry signal, and an output from the NAND gate G77 is supplied to the terminal 10-13 as a borrow signal.

The up-down counter 10 of the above-mentioned arrangement is operated as follows. Where the clear terminal 10-14 is impressed with a positive potential relative to the ground potential, namely, a logic signal "1", then the output terminals 10-2, 10-3, 10-6, 10-7 of the up-down counter 10 give forth a "0" signal. Where, under this condition, the strobe terminal 10-11 receives a "0" signal from the operation circuit 46, then the output teminals 10-2, 10-3, 10-6, 10-7 of the counter 10 give forth the same signal as that which is supplied to the input terminals 10-1, 10-9, 10-10, 10-15 of the up-down counter 10. Where a down-count signal sent from the terminal 20-11 of the counter 20 to the down-count terminal 10-4 is changed to (0) to (9), then the borrow terminal 10-13 generates an output, transmitting a borrow signal to the terminal 11-4 of the higher order counter 11. Conversely where an up-count signal delivered to the terminal 10-5 of the counter 10 is changed from (9) to (0), then the carry terminal 10-12 gives froth a carry signal to the terminal 11-51 of the higher order counter 11.

Figure 11:
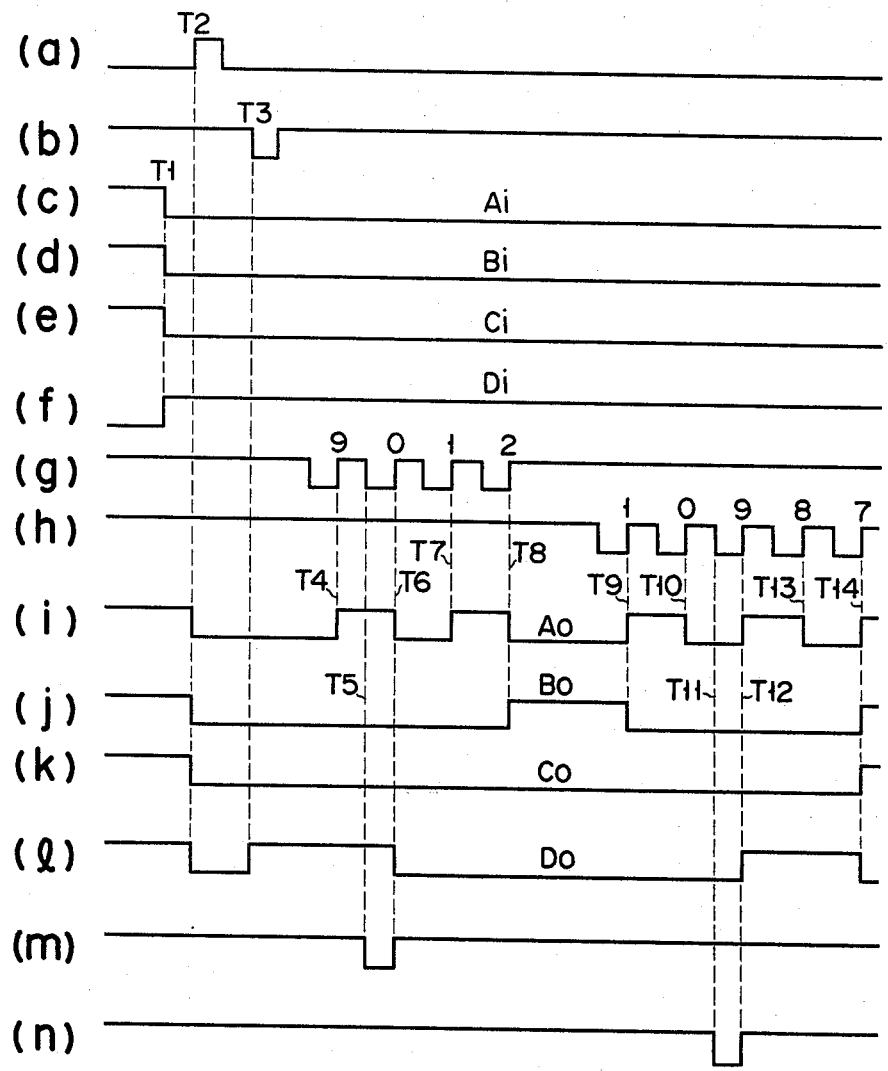
FIG. 11 presents the wave forms of pulses by way of illustrating the operation of the up-down counter of FIG. 10.

There will now be described by reference to FIG. 11 the operation of the up-down counter of FIG. 10. Now let it be assumed that input logical bit signals supplied to the terminals 10-15, 10-1, 10-10, 10-9 are designated as Ai, Bi, Ci, Di and outputs produced at the terminals 10-3, 10-2, 10-6, 10-7 as Ao, Bo, Co, Do. Further let it be supposed that at time T1 the inputs Ai to Di represent "0", "0", "0", "1" respectively as shown in FIG. 11c to FIG. 11f and the outputs Ao to Do all denote "1" as shown in FIG. 11i to FIG. 11l. Where, at the succeeding time T2, the terminal 10-14 is supplied with a clear pulse as shown in FIG. 11a, then the flip-flop circuits F21 to F24 are all cleared to change the outputs Ao to Do to "0". Where, under this condition, a strobe signal of "0" level as shown in FIG. 11 b is supplied to the terminal 10-11, then the output Do has a logical level of "0" as indicated in FIG. 11l in response to the input Di of "1". Where under this condition, the terminal 10-5 is supplied with a count signal as shown in FIG. 11g, then the output Ao is brought to a level of "1" as shown in FIG. 11i at the rising time T4 of an up-count signal (9). At the falling time T5 of an up-count signal (0), the terminal 10-12 gives forth a carry signal as shown in FIG. 11m, and at the rising time T6 of the up-count signal (0). The output Ao is changed to "0" as indicated in FIG. 11i and also the output Do is brought to a level of "0" as shown in FIG. 11l, thus extinguishing the carry signal. Where an up-count signal (1) rises at time T7, then the output Ao is changed to "1". Where an up-count signal (2) rises at time T8, then the output Ao has a level of "0" and the output Bo is changed to "1". Thus, counts represented by 4-bit binary code outputs progressively increase. Where, at the succeeding time T9, a down-count signal (1) of FIG. 11h rises at the terminal 10-4, then the output Ao is changed to "1" and the output Bo to "0". Where a down-count signal (0) rises at time T10, then all the outputs Ao to Do are brought to a level of "1". Thus at time T11, a down-count signal (9) falls and in consequence a borrow signal is produced from the terminal 10-13. Further, the down-count signal (9) rises at time T12, and the outputs Ao and Do are changed into "0" to extinguish the borrow signal. Where a down-count signal (8) rises at time T13, then the output Ao has a level of "0". Where a down-count signal (7) rises at the succeeding time T14, then the outputs Ao, Bo and Co are changed to "1" and the output Do to "0". A down-count operation proceeds in the above-mentioned manner.

Counts (including zero) made by the counters 10, 11, 12 are delivered to the circuits 31, 32, 33 of the display section of FIG. 1A for decoding to effect binary code-decimal conversion and driving a display device (hereinafter simply referred to as "a decoder/driver circuit") in the form of 4-bit signals coded with a weight of 1-2-4-8. Binary code signals supplied to the terminals 31-1, 31-2, 31-6, 31-7; 32-1, 32-2, 32-6, 32-7; and 33-1, 33-2, 33-6, 33-7 of the decoder/driver circuits 31, 32, 33 respectively are decoded into decimal signals, followed by amplification, and then delivered to digital display devices 34, 35, 36 through the corresponding terminals 31-9 to 31-15; 32-9 to 32-15; and 33-9 to 33-15. The decoder/driver circuit 31 comprises, as shown in FIG. 12, NAND/NOR gate circuits G110 to G117, AND gates G118 to G141, inverter circuits I31 to I39 and amplifiers A11 to A13 all assembled in an integrated form.

Figure 12:
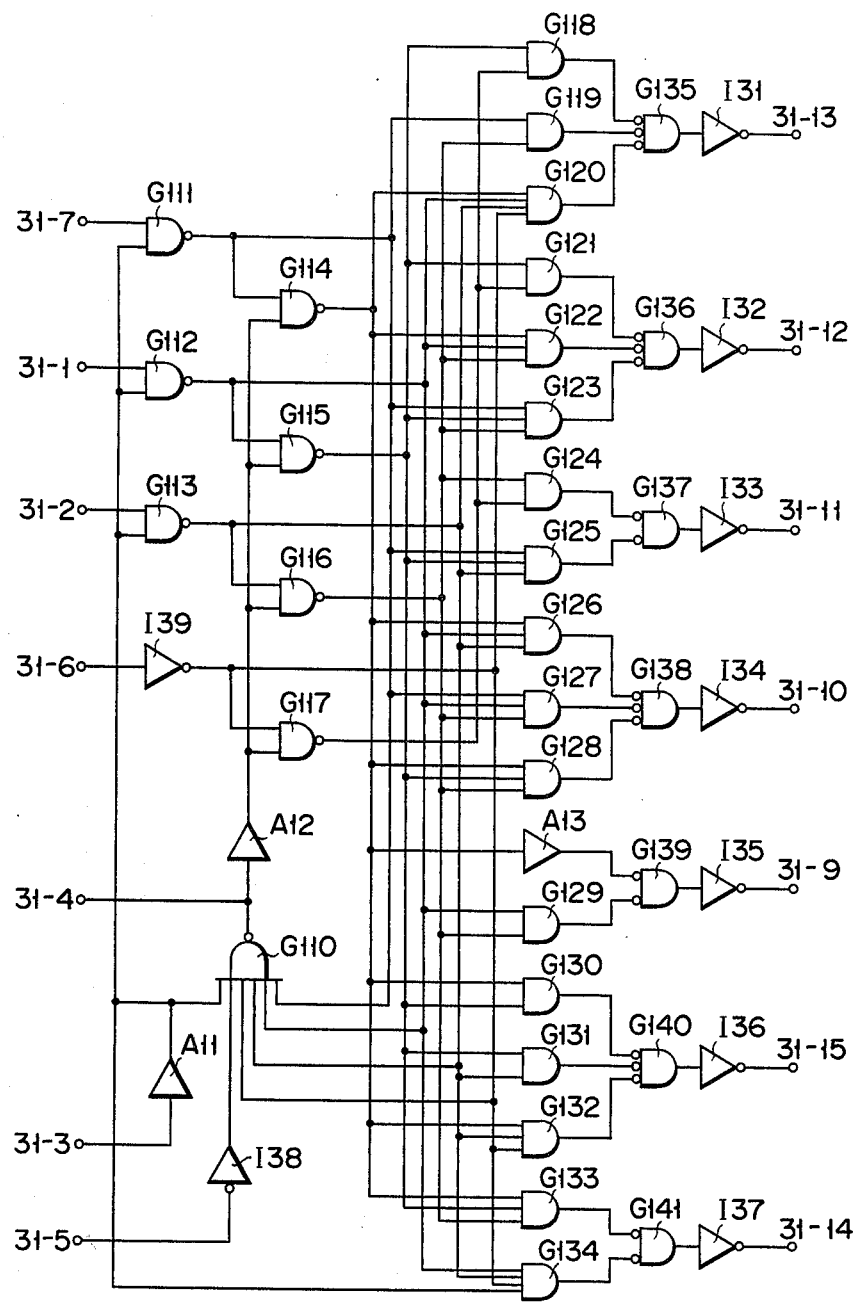
FIG. 12 is a concrete diagram of the binary code-decimal numeral conversion gate shown in FIG. 1A.

Referring to FIG. 12, the inputs Ai, Bi, Ci, Di supplied to the terminals 31-7, 31-1, 31-2, 31-6 are transmitted to one input terminal each of the NAND gates G111, G112, G113 and also to the inverter I39. The other input terminals of the NAND gates G111, G112, G113 are supplied with a lamp test signal from the terminal 31-3 through the amplifier A11. Outputs from the NAND gates G111 to G113 and inverter I39 are supplied to one input terminal each of the NAND gates G114 to G117 and also to the selected ones of the AND gates G118 to G134. The other input terminals of the NAND gates G114 to G117 are supplied with a blanking input from the terminal 31-4 and an output from the NAND gate G110. The input terminal of the NAND gate G110 is supplied with an output from each of the amplifier A11, inverters I38, I39, and NAND gates G111 to G113. Outputs from the NAND gates G114 to G117 are supplied to the selected ones of the AND gates G118 to G134 and also to the amplifier A13. Outputs from the AND gates G118 to G120 are supplied to the AND gate G135; outputs from the AND gates G121 to G123 to the AND gate G135; outputs from the AND gates G124, G125 to the AND gate G137; outputs from and AND gates G126 to G128 to the AND gate G138; outputs from the amplifier A13 and an output from the AND gate G129 to the AND gate G139; outputs from the AND gates G130 to G132 to the AND gate G140; and outputs from the AND gates G133, 134 to the AND gate G141. The input terminals of all the AND gates G135 to G141 are provided with the corresponding inverters as shown in FIG. 12. Outputs from the AND gates G135 to G141 are conducted to the output terminals 31-13, 31-12, 31-11, 31-10, 31-9, 31-15 and 31-14 through the corresponding inverters I31 to I37. The other decoder/driver circuits 32, 33 have the same arrangement as the decoder/driver circuit 31.

Figure 13:
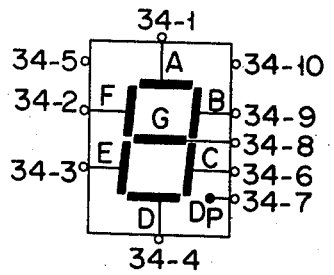
FIG. 13 illustrates a display device used in FIG. 1A.
Figure 14:
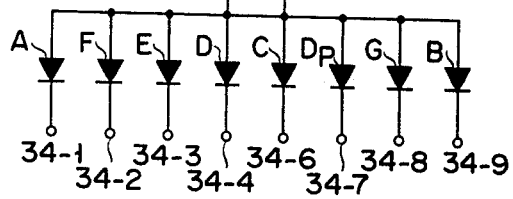
FIG. 14 is a circuit diagram of the display device of FIG. 13 consisting of light-emitting diodes.

Binary code signals converted into decimal numerals by the decoder/driver circuits 31, 32, 33 are transmitted to the corresponding input terminals of the display devices 34, 35, 36 from three groups of seven terminals as 31-9 to 31-15; 32-9 to 32-15; and 33-9 to 33-15 through the corresponding resistors R. The display device 34 consists of eight display segments A, B, C, D, E, F, G, $D_p$ as illustrated in FIG. 13. These display segments A to $D_p$ are connected, as shown in FIG. 13, to the input terminals 34-1, 34-9, 34-6, 34-4, 34-3, 34-2, 34-8, 34-7. The display segments A to $D_p$ are formed of, for example, light-emitting diodes, and are impressed with voltages selectively across the anodes connected to the terminals 34-5 and 34-10 and the cathodes connected to the terminals 1-4 and 6-9 for illumination display. The display device 34 has a circuit arrangement as shown in FIG. 14. A numeral 3, for example, as indicated by the illumination of the display segments A, B, G, C, D. The display segment $D_p$ denotes a decimal point, and, in the embodiment of FIG. 1A, only the terminal 35-7 of the display device 35 is impressed with voltage.

Outputs from the up-down counters 10, 11, 12 are further supplied to the gage circuits 40, 41 of the time detection section. This time detection section detects the counts made by the counters 10, 11, 12, and when said counts reach a prescribed value, namely, a preset point of time, sends forth its own output to the operation circuit 46. The time detection section consists of gage circuits 40, 41, 42, 43, inverters 44, 45 and a capacitor C4. The gate circuits 40, 41 may each be formed of the integrated circuit of FIG. 6; the gate circuit 42 of the integrated circuit of FIG. 5; the gate circuit 43 of the integrated circuit of FIG. 3; and the inverters 44, 45 of the integrated circuit of FIG. 9. The numerals following the hyphens included in the referential notations of the terminals of these circuits correspond to the referential numerals of the terminals of the respective integrated circuits.

An output from the time detection section is supplied through the capacitor C4 to the operation circuit 46 of the electronic range-controlling section.

This electronic range-controlling section is connected to an A.C. source 47 and comprises a power supply switch 48; bidirectional thyristor 49; an NPN transistor 50 for controlling the ON-OFF state of the thyristor 49; an inverter 51 and gate circuit 27 for rendering the transistor 50 operative or inoperative according to a signal from the operation circuit 46; an electromagnetic switch 52 energized in response to the operation of the thyristor 49; the main contacts 51-1, 52-2 of the electromagnetic swtich 52; a high frequency generator 53 having power supply thereto controlled by the main contacts 52-1, 52-2; a D.C. control power source 54; and the operation circuit 46. The inverter 51 may be formed of the integrated circuit of FIG. 9 and the gate circuit 27 of the integrated circuit of FIG. 3. The high frequency generator 53 is intended to emit high frequency electromagnetic wave into the heating chamber of the electronic range, and consists of a high voltage transformer 55, heater transformer 56, recitifier circuit 57 and magnetron 58. The D.C. control power circuit 54 is designed to supply direct current to all other circuits than that associated with the high frequency generator 53, and consists of a transformer 59, rectifier circuit 60 and constant voltage diode 61. The operation circuit 46 is mainly formed of a start switch 62 for commencement of cooking or heating, a switch stop 63 for stoppage of cooking or heating, reset switch 64, semiconductor-controlled rectifier elements (abbreviated as SCR) 65, 66 and diodes 67, 68. The start and stop switches 62, 63 and reset switch 64 are of normally closed push-button type. The cooking stop switch 63 may be so designed as to be rendered inoperative and operative, for example, in interlocking relationship with the opening and closure of the door of the heating chamber.

There will now be described the operation of the embodiment of FIGS. 1A to 1D. Throughout the following description, a "0" signal is the one denoting the ground potential, and a "1" signal is the one showing positive potential relative to the ground potential, namely, output voltage +V (for example, 5 volts) from the D.C. control power source 54.

When the power supply switch 48 is thrown in, an output voltage from the power source 54 rises to a level of +V (about 5 volts). At this time, a transient signal flows through a resistor R4, capacitor C5 and resistor R5 to charge the capacitor C5. Voltage impressed across both ends of the resistor R5 by the charge current is supplied to the gate of the SCR 66. Thus the SCR 66 is rendered operative to have its anode side voltage level brought to that of "0". As the result, the terminal 27-10 of the gate circuit 27 connected to the anode of the SCR 66 and the terminals 10-11, 11-11, 12-11 of the up-down counters 10, 11, 12 respectively present a "0" voltage level. Outputs c, d, e from the up-down counters 10, 11, 12 have the same level as seen from the timing chart of FIG. 11, as input signals, namely, output signals f, g, h from the time-setting section. The above-mentioned output signals c, d, e are supplied to the display devices 34, 35, 36 through the decoder/driver circuits 31, 32, 33 so as to dispaly set time in the form of decimal numerals. Since, at this time, an input signal to the input terminal 27-10 of the gate circuit 27 has a logical level of "0", one input terminal of the NAND gate G13 of FIG. 3 also has a logical level of "0", causing the output terminal 27-8 to give forth a "1" output, and in consequence the output terminal 51-8 of the inverter 51 to produce a "0" output. This "0" output renders the NPN transistor 50 in the OFF state and in consequence the bidirectional thyristor 49 inoperative. As the result, the electromagnetic switch 52 is deenergized and the high frequency generator 53 is also put out of operation. On the other hand, the gate circuit 27 generates an output of "1" and accordingly the inverter 25 produces an output of "0". Since the input terminals 24-5, 24-6 of the gate circuit 24 have a logical level of "0", the output terminal of the NOR gate 42 of FIG. 6, namely, the output terminal 24-4 of the gate circuit 24 gives forth "1" output, thus rendering the transistor 21 operative and the light-emitting diode 29 extinguished. Under this condition, pulses being supplied to the input terminal 20-14 of the counter 20 included in the pulse-generating section are already grounded. Therefore, the output terminal 20-11 of the pulse-generating section does not send forth any pulse to the input terminal of the up-down counter 10. Though, under the above-mentioned conditions, the display devices 34, 35, 36 indicate different categories of time already set by the time-setting switches S1, S2, S3, no time counting is carried out, nor is applied any heating.

When the cooking start switch 62 is closed after a prescribed length of heating time is set, then both ends of the SCR's 65, 66 respectively are forcefully short-circuited in a moment, if an output from the time detection section, namely, an input to the gate of the SCR 66 has a level of "0", thereby turning off the SCR's 65, 66. As the result, the anode of the SCR 66 has a logical level of "1", the transistor 50 is put into operation, and the transistor 21 is rendered inoperative. When the transistor 50 is thus put into operation, the thyristor 49 is triggered for operation to energize the electromagnetic switch 32. Accordingly, the main contacts 52-1, 52-2 of the switch 52 are closed to actuate the high frequency generator 53, for the thermal cooking of foods placed in the heating chamber (not shown) of the electronic range. Since, at this time, the transistor 21 is turned off, the pulse-generating section sends forth pulses to the counter 20, where the number of pulses supplied thereto is counted down. Thus, the counts previously stored in the counters 10, 11, 12 downwardly vary with the count condition within the counter 20. The display devices 34, 35, 36 indicate the downward variations of counts in the counters 10, 11, 12. At this time, the light-emitting diode 29 is supplied with pulses from the monostable multivibrator 22 of the pulse-generating section in response to the inoperative condition of the transistor 21. The light-emitting diode 29 is energized and extinguished per pulse period. This intermittent actuation of the light-emitting diode 29 shows that the high frequency generator 53 is in operation.

Where the cooking stop switch 63 is closed during the operation of the high frequency generator 53, then the gate of the SCR 65 is supplied with a "1" signal and becomes operative. Accordingly, the input terminal 27-9 of the gate circuit 27 is supplied with a "0" signal, and the gate circuit 27 generates a "1" output and in consequence the inverter 51 produces a "0" output, causing the transistor 50 to be turned off and the transistor 21 to be turned on. The thyristor 49 is put out of operation to stop the high frequency generator 53. Also, the transistor 21 is operated to extinguish the light-es emitting diode 29 and stop the supply of pulses to the counter 20. Since, at this time, the SCR 66 remains inoperative with its anode kept at a logical level of "1", the counters 10, 11, 12 hold the counts which they made at the closure of the cooking stop switch 63, and the display devices 34, 35, 36 make indications corresponding to the counts held by the counters 10, 11, 12.

Where the reset switch 64 is closed during the operation of the high frequency generator 53 or after the closure of the cooking stop switch 63, then the SCR 66 becomes operative with its potential changed to a level of "0", causing the transistor 50 to be turned off and the transistor 21 to be turned on. As the result, heating of the foods and the operation of the timer are brought to an end. Since the logical level of the anode of the SCR 66 is changed to "0", the outputs $c, d, e$ from the counters 10, 11, 12 have the same logical level as the input signals $f, g, h$. As the result, indications on the display devices 34, 35, 36 are brought back to those representing the length of time originally set at the commencement of heating.

Where the preset time of cooking has passed after the closure of the cooking start switch 62, then the counter 20 is subjected to down counting, and the counts previously made thereby are brought to (0). At this time, the outputs $c, d, e$ from the counters 10, 11, 12 all have a logical level of "0", showing that the counts made by these counters 10, 11, 12 coincide with a prescribed length of time. As the result, the gate circuits 40, 41 of the time detection section are all supplied with an input of "0". Namely, the NOR gates G41, G42, G43, G44 of FIG. 6 are all supplied with an input of "0". Therefore, the gate circuits 40, 41 generate a "1" output, which is supplied to the gate circuit 42. Since all the input terminals of FIG. 5 are made to have a logical level of "1", the NAND gates G31, G32, G33 produce an output of "0", and in consequence the inverter 44 gives forth an output of "1". This "1" output is supplied to the two input terminals 43-1, 43-2 of the gate circuit 43. Since the input signals to the gate G11 of FIG. 3 have a logical level of "1", the output terminal 43-3 of the gate circuit 43 produces a "0" signal, and in consequence the inverter 45 generates a "1" output. This "1" output is supplied to the gate electrode of the SCR 66 through the capacitor C4 to render the SCR 66 operative. Since the anode potential of the SCR 66 has a level of "0", the high frequency generator 53 is stopped, the light-emitting diode 29 is extinguished and the counter 20 ceases to be supplied with pulses. Thus, the display devices 34, 35, 36 make the same indications as those representing the initially set length of time. Thus, upon lapse of the preset time, thermal cooking is brought to an end.

While the time-setting section sets time at (0), then the contacts S10, S20, S30 of the time-setting switches S1, S2, S3 remain closed. At this time, all the input signals to the gate circuit 9 have a logical level of "0". Namely, the gates G43, G44 of FIG. 6 are all supplied with a "0" input and generate a "1" output. Since two input signals to the gate circuit 13 have a logical level of "1", the gate circuit G12 of FIG. 3 is supplied with two "1" input signals and produces a "0" output. Accordingly, the gate circuit 14 is supplied with a "0" input, and in consequence the NAND gate G14 of FIG. 3 is supplied with two "0" input signals and gives forth a "1" output. This "1" output is conducted to the gate electrode of the SCR 66 through the diode D4 to actuate the SCR 66, which remains thus energized, preventing heating of the foods and the operation of the timer and causing all the display devices 34, 35, 36 to continue to make the (0) indication.

In the embodiment of FIGS. 1A tp 1D the time-setting switches S1, S2, S3 may consist of any of the push-button switch, snap switch, rotary switch, keyboard switch, etc. Further, the pulse generation circuit may be formed of a cuptal generator or astable multivibrator. It is also possible to use the thyristor 49 directly in turning on or off the power source of the high frequency generation circuit, instead of energizing or deenergizing the electromagnetic switch 52 according to the ON or OFF condition of the thyristor 49. The thyristor 49 need not be limited to a bidirectional type but may be formed of an SCR. Further, the up-down counters 10, 11, 12 may act simply as up-counters in place of down-counters. In this case, it is advised to provide in the time detection section a coincidence circuit which compares outputs from the time-setting section and those from the counters 10, 11, 12 and generates its own output, in case coincidence takes place between the two groups of outputs. The embodiment of FIGS. 1A to 1D comprises a large number of integrated circuits. If, however, these integrated circuits are further integrated, then a very compact electronic digital timer will be obtained.

There will now be described by reference to FIGS. 15A, 15B the construction of an electronic digital timer according to another embodiment of this invention. The parts of FIGS. 15A, 15B the same as those of FIGS. 1A to 1D are denoted by the same numerals, description thereof being omitted. The first embodiment comprises three time-setting switches, namely, can set time in units of 0.1 minute by the switch S1, in units of 1 minute by the switch S2 and in units of 10 minutes by the switch S3, namely up to 59.9 minutes using the three switches S1, S2, S3. Actually, however, a length of time represented by digits of three orders is rarely used, but a pattern of generally set time often consists of digits of two orders, for example, 59 minutes or 9.9 minutes. Therefore, it is sometimes considered wasteful to provide a time-setting device always capable of making time indication comprising digits of three orders.

In view of the above-mentioned circumstances, therefore, the undermentioned embodiment is only provided with means for setting and displaying a length of time consisting of digits of two orders and consequently is simplified in arrangement by being so designed as to vary the units of time being set, namely, attain such time setting as 59 minutes or 9.9 minutes. According to this second embodiment, a time constant circuit for determining the oscillating frequency (period) of a pulse generator 17a mainly formed of a unijunction transistor 16 comprises a series circuit consisting of a capacitor C1 and variable resistor VR-1 and another series circuit consisting of the capacitor C1 and variable resistor VR-2. The connection of these two series circuits with the generator 17a can be changed over by means of a switch SW-1.

This changeover switch SW-1 is made to work interlockingly with another changeover switch SW-2. The switching operation of the latter changeover switch SW-2 enables the decimal point indication terminals 34-7, 35-7 of the display devices 34, 35 to be changed over from each other. For example, where the latter changeover switch SW-2 is thrown toward the decimal point indication terminal 35-7, then a length of time, for example, 9.9 minutes is indicated. Where the latter changeover switch SW-2 is thrown toward the decimal point indication terminal 34-7, then the unit of time being set is changed to 59 minutes.

Output pulses from the pulse generator 17a are supplied to the terminal 80-2 of a gate circuit 80. The terminal 80-1 of the gate circuit 80 is connected to the base of the transistor 50 and the terminal 80-3 thereof to the terminal 10-4 of the counter 10. This gate circuit 80 may be formed of, for example, the integrated circuit of FIG. 3, with the terminals 80-1, 80-2, 80-3 connected to the terminals 1, 2, 3 respectively and the NAND gate G11 used as a gate circuit.

Figure 16:
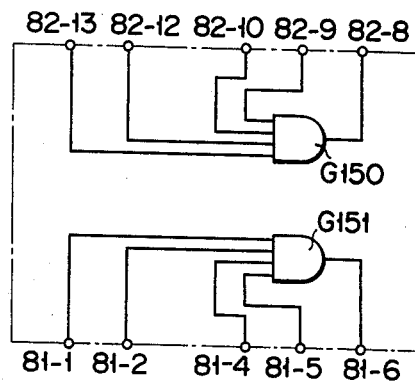
FIG. 16 is a circuit diagram of the respective gates of FIGS. 15A and 15B constituting an integrated circuit.

The output terminals 40-1, 40-4, 40-10, 40-13 are connected to the terminals 81-1, 81-2, 81-4, 8-15 of a gate circuit 81. The output terminal 81-6 of the gate circuit 81 is connected to one terminal of the capacitor C4. This gate circuit 81 may be formed of, for example, the integrated circuit of FIG. 16 having two AND gates G150, G151. The gate circuit 81 consists of the AND gate G151. The terminals 81-1, 81-2, 81-4, 81-5 are connected to the input terminals of the AND gate G151, the output terminal of which is connected to the terminal 81-6.

The anode of the SCR 66 of the operation circuit 46 is connected to the terminals 82-12, 82-13 of a gate circuit 82, and the anode of the SCR 65 is connected to the terminals 82-9, 82-10. The terminal 82-8 is connected to the base of a transistor 50. The gate circuit 82 consists of the AND gate G150 of FIG. 16. The terminals 82-9, 82-10, 82-12, 82-13 of the gate circuit 82 are connected to the input terminal of the gate G150 and the terminal 82-8 is connected to the output terminal of the gate G150.

There will now be described the operation of the embodiment of FIGS. 15A, 15B. Where a prescribed time of cooking is to be set at, for example, 3.4 minutes through operation of the time-setting switches S1, S2, then the changeover switch SW-1 is thrown in as indicated in FIG. 15B. As the result, the pulse generator 17a gives forth output pulses at an interval of, for example, 0.1 minute determined by the time constant elements C1, and VR-1. The changeover switch SWW-2 is also set at the indicated position, causing the terminal 34-7 of the display device 34 to have a logical level of "1" and the terminal 35-7 of the display device 35 to have a logical level of "0". Thus, the decimal point indication segment of the display device 35 emits light to display a decimal point, optically presenting the aforesaid set time of 3.4 minutes.

Upon completion of the time-setting operation, the cooking start switch 62 is closed, causing the anodes of the SCR's 65, 66 to have a logical level of "1". Upon receipt of this "1" signal, the gate circuit 82 produces a "1" signal at its output terminal. As the result, the transistor 50 and in consequence the bidirectional thyristor 49 are rendered operative to actuate the relay 52 for the operation of the high frequency generator 53 shown in FIG. 1C. On the other hand, the counters 10, 11 are put into operation by a "1" signal sent forth from the anode of the SCR 66. Accordingly, pulses delivered from the pulse generator 17a at an interval of 0.1 minute through the gate circuit 80 are counted down by the counters 10, 11. As the result, indications on the display devices 34, 35 are changed as 3.4-3.3-3.2-... 0.1-0. Upon passage of the preset time of 3.4 minutes, all input signals to the gate circuit 40 have a logical level of "0" and in consequence all output signals therefrom have a logical level of "1". Four "1" output signals from the gate circuit 40 are conducted to the terminals 81-1, 81-2, 81-4, 81-5 of the gate circuit 81, whose output terminal 81-6 gives forth a "1" signal, which in turn is supplied to the gate electrode of the SCR 66 through the capacitor C4. As the result, the gate circuit 82 generates a "0" output, and both transistor 50 and thyristor 49 are put out of operation, bringing heating of the foods and the operation of the timer to an end. Thus, indications on the display devices 34, 35 are brought back to the originally set time of 3.4 minutes.

When the changeover switch SW-1 is thrown in toward the variable resistor VR-2, then the time constant circuit consisting of the capacitor C1 and variable resistor VR-2 is connected to the unijunction transistor 16, causing the pulse generator 17a to produce pulses at an interval of 1 minute. At this time, a "1" signal is supplied to the terminal 35-7 of the display device 35 by the changeover switch SW-2 to extinguish a decimal point indicated on the display device 35, namely, to present a newly set time of 34 minutes. In this case it is possible to set a time up to 99 minutes.

Figure 15A:
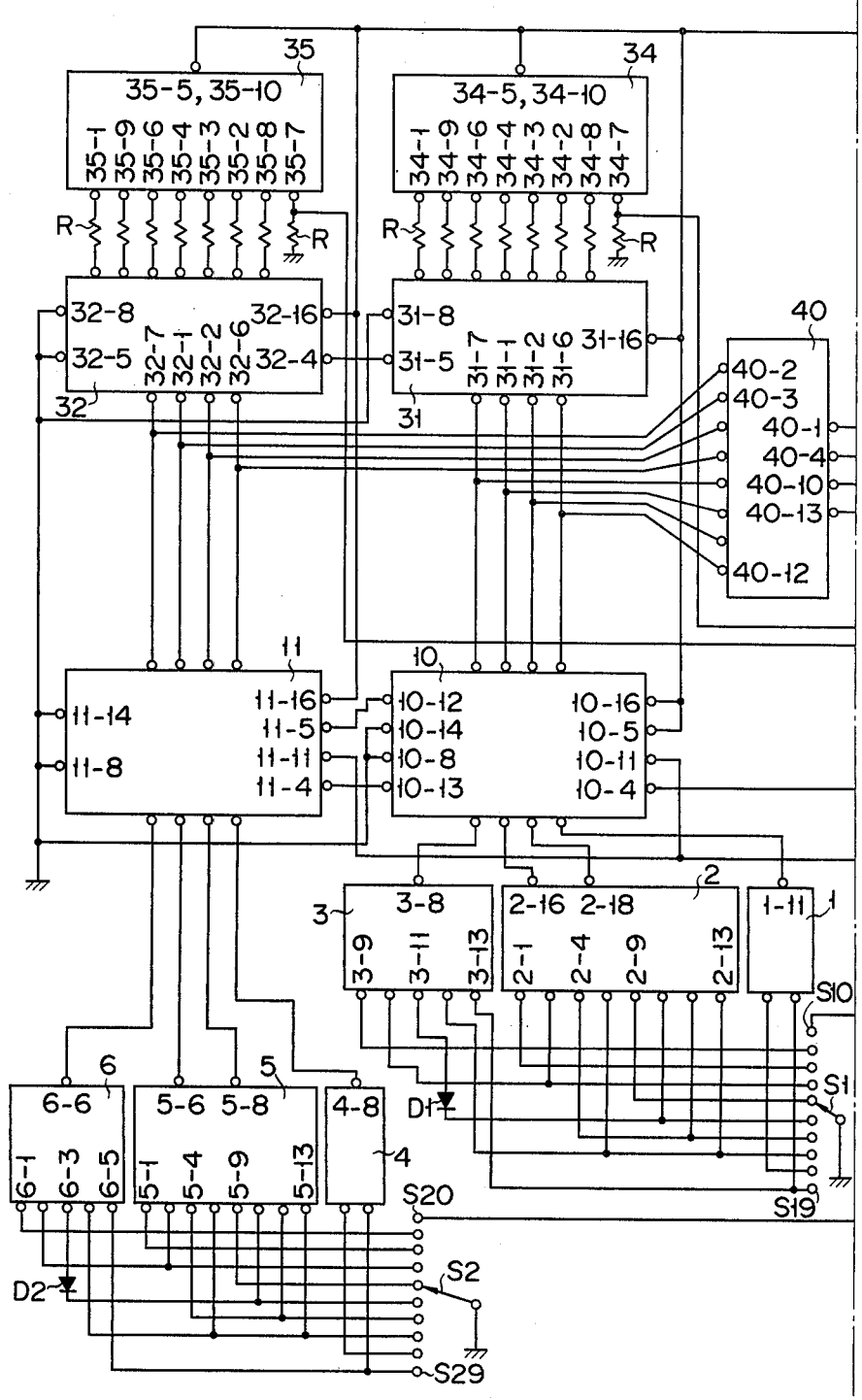
FIGS. 15A and 15B jointly show a circuit arrangement of an electronic digital timer according to another embodiment of the invention.
Figure 15B:
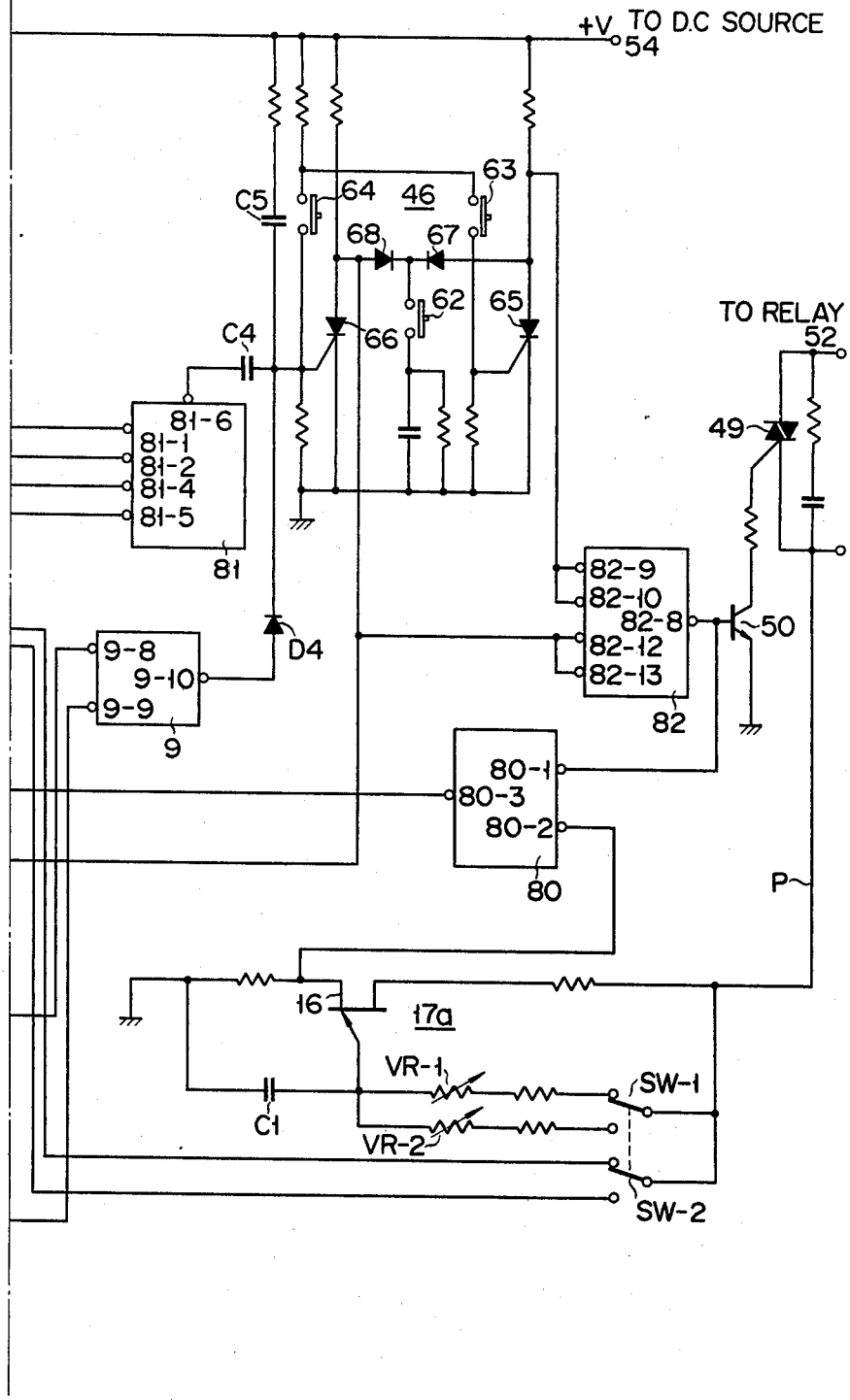

FIGS. 17 and 18 show other modifications of the pulse generator 17a of FIG. 15B. Referring to FIG. 17, a series circuit consisting of the variable resistors VR-1, VR-2 is provided between the power source of +V voltage and capacitor C1. The variable resistor VR-2 is selectively short-circuited by the switch SW-1 or connected in series to the variable resistor VR-1. The terminal 35-7 of the display device 35 is connected to the power source of +V voltage through one fixed contact of the switch SW-1. Under the above-mentioned arrangement, the terminal 35-7 of the display device 35 is supplied with a "0" signal only when the changeover switch SW-1 is brought to the indicated position, causing the display device 35 to indicate a decimal point. At this time, the variable resistor VR-1 alone is connected in series to the capacitor C1 to generate pulses at an interval of, for example, 0.1 minute. When the changeover switch SW-1 is thrown in toward the fixed contact connected to the terminal 35-7 of the display device 35, then the variable resistors VR-1, VR-2 are connected in series to the capacitor C1 to produce pulses at an interval of, for example, 1 minute, preventing the decimal point from being indicated. In this case, a circuit associated with the terminal 34-7 of the display device 34 is not provided, suppressing the indication of a decimal point by the display device 34.

FIG. 18 represents the case where a decimal point is not indicated by the display device 34, but always by the display device 35 whose terminal 35-7 is connected to a resistor R as shown in FIG. 15A. In this case, one contact of the changeover switch SW-1 is made to represent a notation of (×1) and the other contact thereof to represent a notation of (×10) as shown in FIG. 17. Where a numeral (4) is set by the time-setting switch S1 of FIG. 15A, and a numeral (3) by the time-setting switch S2, then the display devices 34, 35 collectively make an indication of 3.4. Where, in this case, the changeover switch SW-1 is in a position indicated in FIG. 18, then a pulse generator 17c produces output pulses at an interval of 0.1 minute. Since the changeover switch SW-1 denotes a magnification degree of (×1) as mentioned above, the set time is read as 3.4 just as presented. When the changeover switch SW-1 is thrown in toward the contact representing (×10), then pulses are generated at an interval of 1 minute. Though, in this case, the display devices 34, 35 still collectively make an indication of 3.4, the set time is read as 3.4×10, namely, 34 minutes, because the (×10) magnification appears on the panel of the electronic digital timer.

What we claim is:

1. An electronic digital timer for an electronic range which comprises a time-setting section for defining a desired length of time; a pulse generator for sending forth pulses at a prescribed interval; a counter section for commencing the counting of pulses given forth by the pulse generator as soon as the electronic range begins heating; a time detection section for producing an output when a prescribed relationship arises between the counts made by the counter section and a length of time previously set by the time-setting section; a control device for stopping heating by the electronic range according to an output from the time detection section; the time detection section having a gate circuit for producing an output when a length of time set by the time-setting section is zero; the control device includes a reset switch; a first SCR whose gate electrode is selectively supplied with outputs from said reset switch, time detection section and gate circuit; a cooking stop switch; a second SCR whose gate electrode is supplied with an output from said cooking stop switch; a cooking start switch; means for forcefully bringing the first and second SCR's into the OFF state upon the closure of the cooking start switch; a transistor rendered operative upon the actuation of the first SCR; a thyristor put into operation upon the energization of said transistor; an electromagnetic switch energized upon the operation of said thyristor; and means for actuating the power supply circuit of the electronic range upon the actuation of said electromagnetic switch.

2. An electronic range with an electronic digital timer comprising:
a time-setting section for defining a desired length of time;
a pulse generator for generating pulses at a prescribed interval;
a counter section for commencing the counting of pulses generated by the pulse generator as soon as the electronic range begins a heating operation;
a time detection section for generating an output when a prescribed relationship arises between the number of pulses counted by the counter section and a length of time previously set by the time-setting section;
a control device for stopping the heating operation of the electronic range in accordance with an output from the time detection section;
display means for indicating in the form of digits the length of time previously set by the time-setting section and the number of pulses counted by the counter section;
the counter section being set at a value corresponding to the length of time set by the time-setting section to, when supplied with a signal instructing the commencement of the heating operation of the electronic range, count down the number of pulses generated by the pulse generator;
the control device having a switch rendered inoperative by an output signal from the time detection section;
means for controlling a power supply to a high frequency generator of the electronic range through the switch.

3. An electronic range according to claim 2 wherein the time-setting section comprises at least one rotary switch for setting time by the decimal system and a decimal numeral-binary code conversion circuit for converting a decimal output from said rotary switch into binary code signals; and the counter section includes binary up-down counters set by an output from said decimal numeral-binary code conversion circuit.

4. An electronic range according to claim 2 which further comprises a light-emitting indication element actuated by pulses delivered from the pulse-generating section to the counter section upon commencement of heating by the electronic range, thereby indicating the progress of heating by the electronic range.

5. An electronic range according to claim 2 wherein the counter section has at least one down-counter; and the time detection section has a gate circuit for generating an output when the counts made by the down-counter are brought to zero upon the passage of the previously set time.

6. An electronic range according to claim 2 wherein the time detection section has a gate circuit for producing an output when a length of time set by the time-setting section is zero; and the control device includes a reset switch; a first SCR whose gate electrode is selectively supplied with outputs from said reset switch, time detection section and gate circuit; a cooking stop switch; a second SCR whose gate electrode is supplied with an output from said cooking stop switch; a cooking start switch; means for forcefully bringing the first and second SCR's into OFF state upon the closure of the cooking start switch; a transistor rendered operative upon the actuation of the first SCR; a thyristor put into operation upon the energization of said transistor; an electromagnetic switch energized upon the operation of said thyristor; and means for actuating the power supply circuit of the electronic range upon the actuation of said electromagnetic switch.

7. An electronic range according to claim 2 wherein the display device has a plurality of display segments formed of light-emitting diodes.

8. An electronic range according to claim 7 wherein the display device further includes a display segment for presenting a decimal point.

9. An electronic range according to claim 2 wherein the pulse-generating section comprises a first time constant circuit including a first variable resistor; a second time constant circuit including a second variable resistor; and a first switch for changing over the connection of the first and second time constant circuit with said pulse-generating section.

10. An electronic range according to claim 7 which further comprises at least two display devices for indicating a length of time set by the time-setting section including a decimal point; and a second switch for changing over the indication of a decimal point between the display devices in interlocking operation with the first switch.

11. An electronic range according to claim 2 wherein the pulse-generating section includes first and second time constant circuits connected in series; a short circuit of said second time constant circuit; and a switch provided with a first contact for closing said short circuit and a second contact for connecting the first and second time constant circuits to the pulse-generating section, and there are further provided at least two display devices including a first display device for indicating a length of time previously set by the time-setting section with a decimal point included and a second display device for indicating a digit of lower order than that indicated by the first display device; and means for causing the first display device to indicate a decimal point when said second contact is closed.

* * * * *